US009710080B2

(12) United States Patent
Katayama

(10) Patent No.: US 9,710,080 B2
(45) Date of Patent: Jul. 18, 2017

(54) PORTABLE ELECTRONIC DEVICE INCLUDING CONTACT SENSORS, AND METHOD FOR CONTROLLING SAME

(71) Applicant: NEC CASIO MOBILE COMMUNICATIONS, LTD., Kawasaki-shi, Kanagawa (JP)

(72) Inventor: Toru Katayama, Kawasaki (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/443,416

(22) PCT Filed: Jun. 18, 2013

(86) PCT No.: PCT/JP2013/003789
§ 371 (c)(1),
(2) Date: May 18, 2015

(87) PCT Pub. No.: WO2014/080546
PCT Pub. Date: May 30, 2014

(65) Prior Publication Data
US 2015/0309602 A1    Oct. 29, 2015

(30) Foreign Application Priority Data

Nov. 20, 2012  (JP) ................................ 2012-254218

(51) Int. Cl.
 G06F 3/041   (2006.01)
 G06F 3/0488  (2013.01)
 H04M 1/725  (2006.01)
(52) U.S. Cl.
 CPC ............ *G06F 3/041* (2013.01); *G06F 3/0416* (2013.01); *G06F 3/0488* (2013.01);
 (Continued)

(58) Field of Classification Search
 CPC ...... G06F 3/041; G06F 3/0414; G06F 3/0416; G06F 3/044–3/047;
 (Continued)

(56) References Cited

U.S. PATENT DOCUMENTS 7,800,592 B2   9/2010  Kerr et al.
7,889,175 B2   2/2011  Kryze et al.
(Continued)

FOREIGN PATENT DOCUMENTS

CN    101432677 A    5/2009
CN    102016765 A    4/2011
(Continued)

OTHER PUBLICATIONS

International Search Report for PCT Application No. PCT/JP2013/003789, mailed on Jul. 16, 2013.
(Continued)

*Primary Examiner* — Nathan Danielsen

(57) ABSTRACT

A portable electronic device provided with a detection section for detecting a contact pattern of a contact object to a housing; a storage section capable of storing an operating state of the portable electronic device and the contact pattern in association with each other; a judgment section for judging whether or not a contact pattern corresponding to the detected contact pattern has been stored in the storage section; a control section for controlling the portable electronic device to enter the operating state associated with the contact pattern and stored in the storage section when the corresponding contact pattern is judged to have been stored in the storage section; and a learning section for storing in the storage section the detected contact pattern and an operating state of the portable electronic device executed by a user when or immediately after the contact pattern is detected in association with each other.

10 Claims, 9 Drawing Sheets

(52) U.S. Cl.
CPC .......... *H04M 1/72522* (2013.01); *G06F 2203/04106* (2013.01); *H04M 2250/22* (2013.01)

(58) Field of Classification Search
CPC .......... G06F 3/0481–3/04886; G06F 2203/04104–2203/04106; H04M 1/72522–1/72561; H04M 2250/22
See application file for complete search history.

(56) References Cited

U.S. PATENT DOCUMENTS

| | | |
|---|---|---|
| 8,031,175 B2 | 10/2011 | Rigazio et al. |
| 2006/0111093 A1 | 5/2006 | Shim et al. |
| 2006/0197750 A1 | 9/2006 | Kerr et al. |
| 2006/0197753 A1 | 9/2006 | Hotelling |
| 2009/0139778 A1 | 6/2009 | Butler et al. |
| 2009/0262073 A1 | 10/2009 | Rigazio et al. |
| 2010/0007618 A1* | 1/2010 | Park .......... G06F 3/041 345/173 |
| 2010/0164877 A1 | 7/2010 | Yu et al. |
| 2011/0279384 A1* | 11/2011 | Miller .......... G06F 3/04883 345/173 |
| 2012/0032979 A1* | 2/2012 | Blow .......... G06F 3/04817 345/173 |
| 2016/0070399 A1 | 3/2016 | Hotelling |

FOREIGN PATENT DOCUMENTS

| | | |
|---|---|---|
| CN | 102272701 A | 12/2011 |
| JP | 2001157985 A | 6/2001 |
| JP | 2008-532185 A | 8/2008 |
| JP | 2008-537615 A | 9/2008 |
| JP | 2008282084 A | 11/2008 |
| JP | 2010109789 A | 5/2010 |
| JP | 2010532143 A | 9/2010 |
| JP | 2011223285 A | 11/2011 |
| JP | 2012039581 A | 2/2012 |
| JP | 2012049915 A | 3/2012 |
| WO | 2012/021417 A1 | 2/2012 |
| WO | 2012087308 A1 | 6/2012 |

OTHER PUBLICATIONS

Extended European Search Report for EP Application No. EP13857145.0 dated on Jun. 14, 2016.
Chinese Office Action for CN Application No. 201380060174.0 issued on Aug. 24, 2016 with English Translation.
Japanese Office Action for JP Application No. 2014-548432 mailed on Feb. 8, 2017 with English Translation.
Chinese Office Action for CN Application No. 201380060174.0 issued on Feb. 14, 2017 with English Translation.

* cited by examiner

[PRESCRIBED CONTACT PATTERN INFORMATION]

| CONTACT PATTERN INFORMATION | EXECUTED APPLICATION NAME |
|---|---|
| (K001) | A |
| (K002) | B |
| (K003) | C |
| ⋮ | ⋮ |

(b)

[LEARNED CONTACT PATTERN INFORMATION]

| CONTACT PATTERN INFORMATION | EXECUTED APPLICATION NAME |
|---|---|
| (G001) | A |
| (G002) | B |
| (G003) | C |
| ⋮ | ⋮ |

(a)

(b)

VALUE OF SET INTERSECTION = "1"
 VALUE OF SET INTERSECTION = "2"

PORTABLE ELECTRONIC DEVICE INCLUDING CONTACT SENSORS, AND METHOD FOR CONTROLLING SAME

This application is a National Stage Entry of PCT/JP2013/003789 filed on Jun. 18, 2013, which claims priority from Japanese Patent Application 2012-254218 filed on Nov. 20, 2012, the contents of all of which are incorporated herein by reference, in their entirety.

TECHNICAL FIELD

The present invention relates to a portable electronic device, a method for controlling same, and a program, and particularly relates to a multifunctional-type portable electronic device, a method for controlling same, and a program.

BACKGROUND ART

Today, portable phones called smartphones have been widely used as multifunctional-type portable electronic devices. One characteristic of the smartphones is user-friendliness in incorporating (installing) applications. More specifically, One characteristic of the smartphones is that, although basic applications have been installed therein in advance, the smartphone users (hereinafter, users) can download applications they want to use anytime they want from a network and freely use them.

However, this characteristic on the other hand causes a disadvantage in that an operation for executing an application takes time. This is because the number of applications to be installed in a smartphone is significantly increased (at least several tens and sometimes up to more than a hundred), whereby an application desired to be executed cannot be easily found.

Generally, the management of applications in a smartphone is performed by objects for activating the applications called icons being arranged on a plurality of menu screens called home screens. In many cases, about 20 icons are arranged on one home screen. Also, if requested, an arbitrary icon is provided in a folder format, and several icons can be collectively arranged in the folder.

In such application management, when executing a desired application, the user performs operations of sequentially opening the home screens, finding the icon of the desired application, and touching the icon. In a case where the icon of the desired application has been stored in an icon in a folder format, an operation of opening the folder is also required.

These operations are not particularly bothersome when the number of installed applications (the number of icons) is small. However, when the number of applications especially exceed a hundred, a considerable amount of time and work is inevitably required as a matter of course.

Accordingly, there is demand from the users to execute a desired application with less effort.

Examples of related techniques meeting this user demand include those of below-described Patent Documents 1 to 4.

Patent Document 1 describes a technique where emergency communication is made when a predetermined contact pattern, which is a pattern of three times of long pressing, three times of short pressing, and three times of long pressing (in other words, a pattern imitating a SOS telegraph code of "--- ••• ---") onto a touch panel in the document is detected.

According to this, a required application (in this case, an application for emergency communication) can be executed by a particular touch operation without finding the corresponding icon every time from home screens.

As a similar technique, Patent Document 2 describes a technique where "the manner of patting" a robot is detected and a user of the robot is identified from the result of the detection. "The manner of patting", which is detected by a pressure sensor provided in a head part, chin, etc. of the robot, corresponds to the predetermined contact pattern of Patent Document 1.

Patent Document 3 describes a technique where one vibration generating section and four vibration receiving sections are provided in the housing of a portable electronic device, vibrations from the thumb of a hand holding the housing are transmitted to the other four fingers, and individual authentication is performed based on the transmission pattern of the vibrations.

Patent Document 4 describes a technique where contact patterns (in the document, one-point contact, two-point contact, or three-point contact) are registered in advance in association with incoming groups of e-mails and phones, and a notification is given by vibrations when an incoming call or e-mail is received. When an actual contact pattern matches a stored contact pattern, a notification notifying that it is an incoming call or e-mail from the registered group is given by the vibrations being stopped.

PRIOR ART DOCUMENTS

Patent Documents

Patent Document 1: JP 2011-223285
Patent Document 2: JP 2001-157985
Patent Document 3: JP 2008-282084
Patent Document 4: JP 2012-049915

SUMMARY OF INVENTION

Problem to be Solved by the Invention

However, the technique of Patent Document 1 can be applied only to a particular internal operation (carrying out emergency communication) and has a problem in that versatility is low. Similarly, the technique of Patent Document 2 can be applied only to a particular internal operation (identification of a user) and has a problem in that versatility is low.

The technique of Patent Document 3 requires a single vibration generating section and four vibration receiving sections, and therefore has a problem in that the number of parts is increased and the cost is inevitably increased.

The technique of Patent Document 4 can support only particular contact patterns such as one-point contact, two-point contact, or three-point contact and therefore has a problem in that versatility is low.

Accordingly, an object of the present invention is to provide a portable electronic device capable of performing highly versatile contact pattern judgment without increasing cost, a method for controlling same, and a program.

Means for Solving the Problem

A portable electronic device of the present invention comprising: a detection section for detecting a contact pattern of a contact object to a housing; a storage section capable of storing an operating state of the portable electronic device and the contact pattern in association with each other; a judgment section for judging whether or not a contact pattern corresponding to the contact pattern detected by the detection section has been stored in the storage section; a control section for controlling the portable electronic device to enter the operating state associated with the contact pattern and stored in the storage section when the judgment section judges that the corresponding contact pattern has been stored in the storage section; and a learning section for storing, in the storage section, the contact pattern detected by the detection section and an operating state of the portable electronic device executed by a user when or immediately after the contact pattern is detected in association with each other.

A method of the present invention for controlling a portable electronic device comprising: a detection step of detecting a contact pattern of a contact object to a housing; a storage step capable of storing an operating state of the portable electronic device and the contact pattern in a storage section in association with each other; a judgment step of judging whether or not a contact pattern corresponding to the contact pattern detected in the detection step has been stored in the storage section; a control step of controlling the portable electronic device to enter the operating state associated with the contact pattern and stored in the storage section when the corresponding contact pattern is judged to have been stored in the storage section in the judgment step; and a learning step of storing, in the storage section, the contact pattern detected in the detection step and an operating state of the portable electronic device executed by a user when or immediately after the contact pattern is detected in association with each other.

A program of the present invention is characterized by a non-transitory computer-readable storage medium having a program stored thereon that is executable by a computer of a portable electronic device to actualize functions comprising: a detection section for detecting a contact pattern of contact object to a housing; a storage section capable of storing an operating state of the portable electronic device and the contact pattern in association with each other; a judgment section for judging whether or not a contact pattern corresponding to the contact pattern detected by the detection section has been stored in the storage section; a control section for controlling the portable electronic device to enter the operating state associated with the contact pattern and stored in the storage section when the judgment section judges that the corresponding contact pattern has been stored in the storage section; and a learning section for storing, in the storage section, the contact pattern detected by the detection section and an operating state of the portable electronic device executed by a user when or immediately after the contact pattern is detected in association with each other.

Effect of the Invention

According to the present invention, a portable electronic device capable of performing highly versatile contact pattern judgment without increasing cost, a method for controlling the same, and a program can be provided.

BRIEF DESCRIPTION OF DRAWINGS

FIGS. 5 (a) and 5 (b) are configuration schematic diagrams of prescribed contact pattern information and learned contact pattern information, respectively.

DESCRIPTION OF EMBODIMENTS

Hereinafter, an embodiment of the present invention will be described with reference to the drawings by taking the application of a multifunctional portable phone called smartphone as an example.

Figure 1:
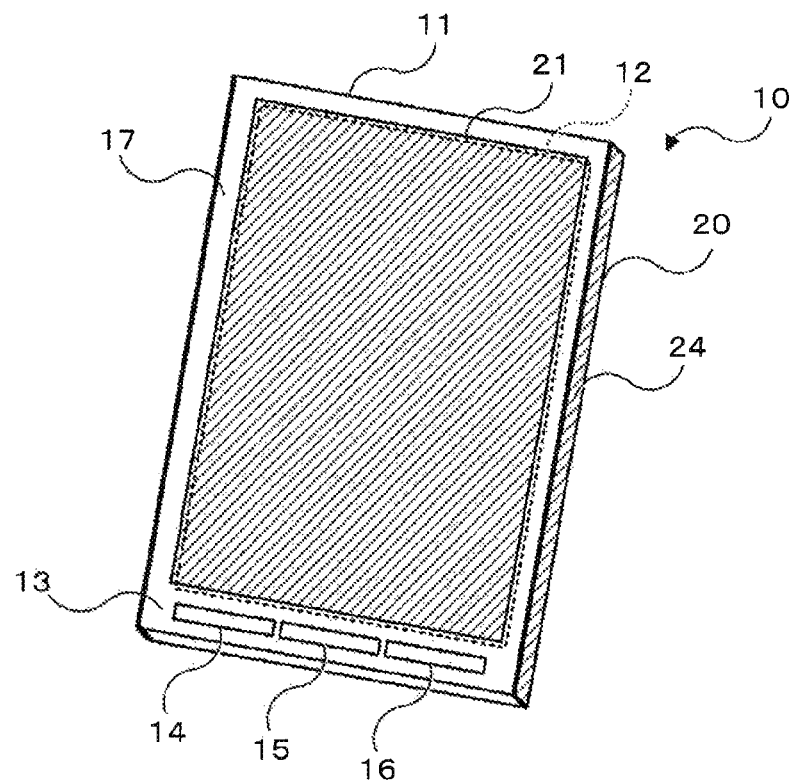
FIGS. 1 (a) and 1 (b) are front and back external views of a portable phone according to an embodiment.
Figure 1:
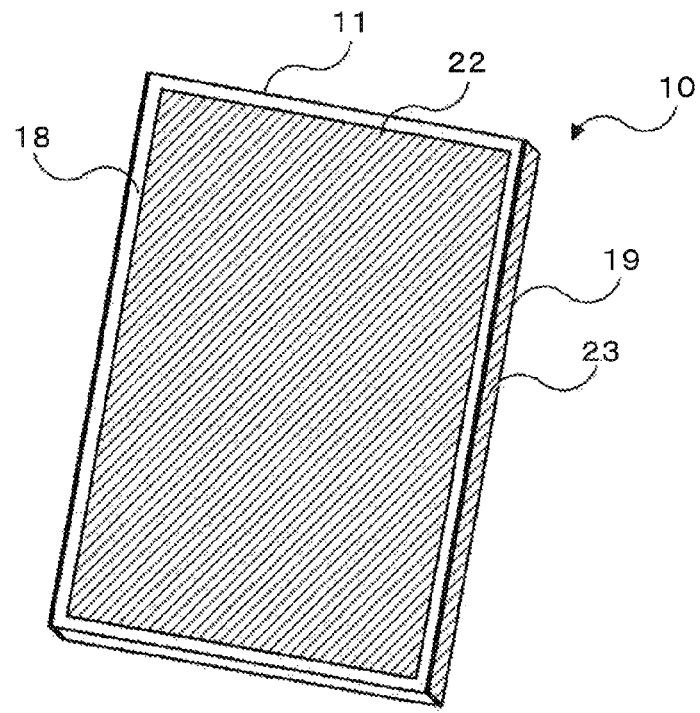

FIGS. 1 (a) and 1 (b) are front and back external views of a portable phone according to an embodiment. A portable phone 10 in this diagram is structured such that a display section 12 such as a liquid crystal panel is arranged on a main surface 17 (operation target surface) of a housing 11 having a shape (for example, tablet shape) that can be hand-held and one or a plurality of (in this case, three as an example) physical key(s) 14 to 16 are arranged within a frame 13 on the lower end side of the display section 12.

The uses of the physical keys 14 to 16 are not particularly limited. For example, according to a general example, the left-side physical key 14 may be used for a menu, the central physical key 15 may be used for returning to a home screen, and the right-side physical key 16 may be used for returning to an immediately-previous screen. Also, although omitted in the drawings, a power switch may be provided on an arbitrary screen of the housing 11 and, if needed, slots for storage media such as an SD card, a connector for both of charging and an external interface, etc. may be provided at arbitrary positions of an arbitrary surface.

As described above, the housing 11 has the shape that can be hand-held, and is provided with a detection section for detecting a contact pattern of a contact object such as a human body when being hand-held or when operated while being hand-held.

Here, the contact pattern of a contact object (signifying a hand [holding hand and operating fingers]) refers to information indicating the manner of holding or the manner of operating the housing 11 when being held by a hand or when some sort of operation is being performed on the portable phone 10 with the housing 11 being held by a hand. More specifically, the contact pattern refers to various information regarding a contact area of a holding hand or operating finger(s) with respect to each surface of the housing 11, such as information quantitatively indicating position (location) of an area and the area size, shape, etc.

In the present embodiment, targets whose contact patterns are detected are four surfaces, which are the main surface 17, aback surface 18, a left lateral surface 19, and a right lateral surface 20 of the housing 11. However, this is an example showing the most desirable best mode. Namely, when the tablet-shaped housing 11 is to be held by one hand such as the right hand, generally, the ball of the thumb (bulge at the base of the thumb) of the right hand comes in contact with the right lateral surface 20, the palm of the right hand comes in contact with the back surface 18, and inside parts of three fingers or four fingers excluding the thumb of the right hand come in contact with the left lateral surface 19. In addition, when a touch operation on the display section 11 is carried out in this state, the operating finger(s) (for example, the thumb of the holding hand or the forefinger or the middle finger of the unused hand) come in contact with the main surface 17.

By four surfaces being set as target surfaces for detecting contact patterns, contact patterns caused by the above-described contacts can be fully detected, which is desirable in practice. However, the detection target surfaces can be reduced to be less than four surfaces in principle. For example, the three surfaces, i.e., the main surface 17, the left lateral surface 19, and the right lateral surface 20 excluding the back surface 18 of the housing 11 may be the detection target surfaces. In the case of the three surfaces, although detection accuracy for contact patterns is reduced, cost can be reduced. Whether to use the four surfaces or the three surfaces may be appropriately selected in consideration of the balance of detection accuracy and cost. Alternatively, the detection target surfaces may be two surfaces, i.e., the left lateral surface 19 and the right lateral surface 20. However, since many portable electronic devices are provided with a touch-panel-equipped display section on a main surface, an embodiment using only two surfaces is not realistic. In practice, three surfaces or four surfaces including the touch panel of the display section should be used.

The detection section for detecting contact patterns can be structured by a plurality of flat-surface-type contact sensors provided on the respective surfaces of the housing 11. In the present embodiment, in accordance with the above-described best mode, a total of four contact sensors are provided respectively on the main surface 17, the back surface 18, the left lateral surface 19, and the right lateral surface 20 of the housing 11. Hereinafter, the contact sensor provided on the main surface 11 will be referred to as a main surface contact sensor 21, the contact sensor provided on the back surface 18 will be referred to as a back surface contact sensor 22, the contact sensor provided on the left lateral surface 19 will be referred to as a left lateral surface contact sensor 23, and the contact sensor provided on the right lateral surface 20 will be referred to as a right lateral surface contact sensor 24.

The main surface contact sensor 21 also serves as a touch panel of the display section 12, and detects contact patterns of a hand of a user with respect to a display screen of the display section 12. The back surface contact sensor 22 detects contact patterns of a hand of the user with respect to the back surface 18 of the housing 11, the left lateral surface contact sensor 23 detects contact patterns of a hand of the user with respect to the left lateral surface 19 of the housing 11, and the right lateral surface contact sensor 24 detects contact patterns of a hand of the user with respect to the right lateral surface 20 of the housing 11.

The four contact sensors (the main surface contact sensor 21, the back surface contact sensor 22, the left lateral surface contact sensor 23, and the right lateral surface contact sensor 24) are used for detecting the contact patterns of a hand as described above. For example, projection-type electrostatic-capacitance touch panels can be used for these contact sensors.

The principle of the electrostatic-capacitance touch panel is to consider a human body as a predetermined electrostatic capacity body and detect touch positions from changes in the electrostatic capacity of the panel caused by contact with the human body. Especially, an electrostatic-capacitance touch panel of a "projection type" can support multi-touch, or in other words, can detect multipoint contact, and therefore can detect contact points not by pinpoint detection but by range (area) detection. Moreover, the electrostatic-capacitance touch panel of the "projection type" can not only detect the position (location) of the contact area, but also can detect the size, shape, etc. of the contact area. Therefore, the electrostatic-capacitance touch panel of the "projection type" is suitable as the detection section for detecting the contact pattern of a hand in the present embodiment.

The electrostatic-capacitance touch panel can detect not only contact of a hand, but approaching of a hand. This is because the electrostatic capacity of the panel is changed when a hand closely approaches the panel. Accordingly, the contact patterns of the present embodiment include the meaning of approach in addition to contact. Note that, although they are hereinafter collectively referred to as contact patterns, this is only for the convenience of explanation, and the contact patterns also include approach in terms of technical ideas.

Here, in a study by the inventors of the present application, the inventors found corresponding relativity between a certain operation performed on the portable phone 10 by a user and the pattern of contact with the housing 11 (holding manner).

Figure 2:
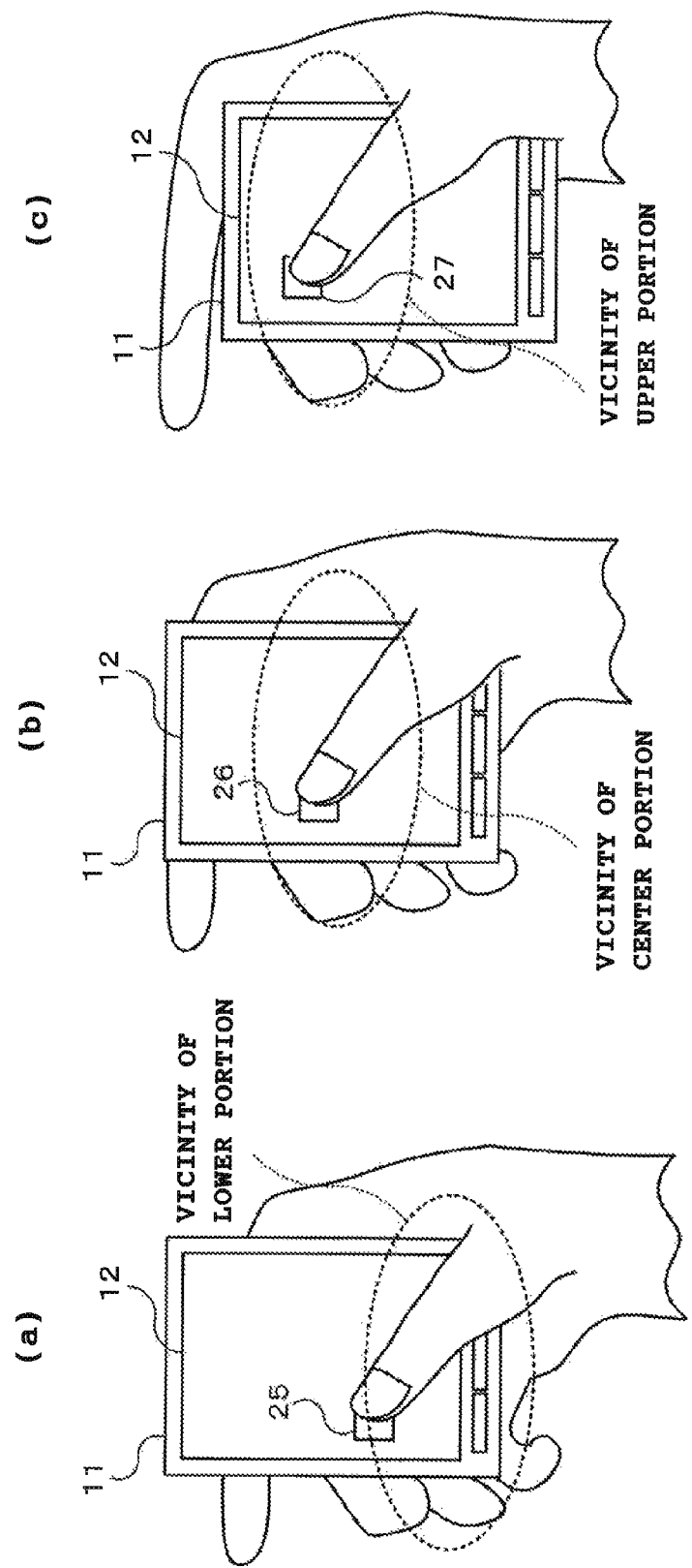
FIGS. 2 (a), 2 (b) and 2 (c) are conceptual diagrams showing contact patterns of a hand.

FIGS. 2 (a), 2 (b) and 2 (c) are conceptual diagrams showing contact patterns of a hand. For example, when touching an icon 25 positioned at a lower portion of the display section 12 so as to execute an application associated with the icon 25, many of the users naturally hold the vicinity of the lower portion of the housing 11, as shown in FIG. 2 (a). Accordingly, a particular contact pattern corresponding to the holding state, in other words, a contact pattern distributed mainly in the vicinity of the lower portion of the housing 11 is detected.

Alternatively, when touching an icon 26 positioned at a center portion of the display section 12 so as to execute an application associated with the icon 26, many of the users naturally hold the vicinity of the center portion of the housing 11, as shown in FIG. 2 (b). Accordingly, a particular contact pattern corresponding to the holding state, in other words, a contact pattern distributed mainly in the vicinity of the center portion of the housing 11 is detected.

Alternatively, when touching an icon 27 positioned at an upper portion of the display section 12 so as to execute an application associated with the icon 27, many of the users naturally hold the vicinity of the upper portion of the housing 11, as shown in FIG. 2 (c). Accordingly, a particular contact pattern corresponding to the holding state, in other words, a contact pattern distributed mainly in the vicinity of the upper portion of the housing 11 is detected.

The relativity is not limited to these examples. For example, when performing an operation of vertical scrolling by using the entire screen, many of the users naturally hold a large portion of the housing 11 because they need to hold the housing 11 tight. Therefore, in this case as well, a particular contact pattern corresponding to the holding state, in other words, a contact pattern distributed in a large portion of the housing 11 is detected. Also, when performing an operation of pinch-in or pinch-out, many of the users hold the housing 11 by one hand and perform the operation by the other hand. Therefore, a particular contact pattern which is different from that when the housing 11 is being held simply by one hand is detected.

These contact patterns are merely examples as a matter of course, and various contact patterns can be detected depending on the habits of users. However, in the study by the inventors of the present application, the inventors found that there is a tendency that, as the users are skilled in the operations, their contact patterns are gradually converged to the contact patterns having the above-described relativity, or in other words, contact patterns having reproducibility.

A point of the present embodiment is to simplify operations related to the execution of applications by using the relativity of the contact patterns.

Figure 3:
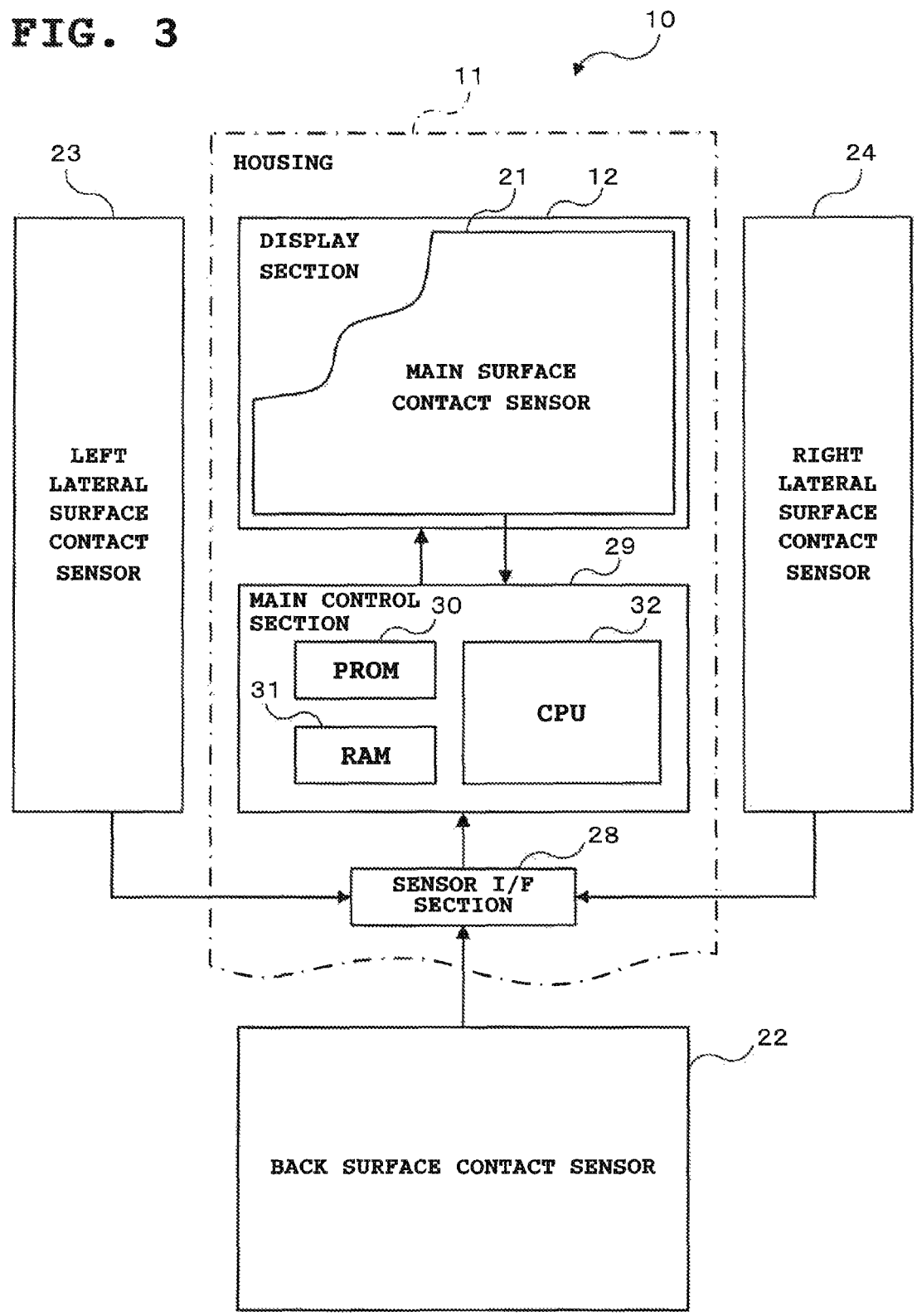
FIG. 3 is an internal block diagram of the portable phone.

FIG. 3 is an internal block diagram of the portable phone. In this diagram, the portable phone 10 is provided with at least a sensor I/F (interface) section 28 mounted in the housing 11, the display section 12 such as a liquid crystal display, the main surface contact sensor 21 also serving as the touch panel of the display section 12, the back surface contact sensor 22 provided on the back surface of the housing 11, the left lateral surface contact sensor 23 and the right lateral surface contact sensor 24 provided on both of the left/right lateral surfaces of the housing 11, and a main control section 29. This portable phone 10 is configured to input signals from the back surface contact sensor 22, signals from the left lateral surface contact sensor 23, and signals from the right lateral surface contact sensor 24 to the main control section 29 via the sensor I/F section 28, input the display information appropriately generated by the main control section 29 to the display section 12, and input signals from the main surface contact sensor 21 to the main control section 29. As a matter of course, the portable phone 10 is provided with a power supply section such as a battery, a wireless communication section for portable phones, and the like, in addition to the above-described sections.

The main control section 29 is a control element of a program control type. This main control section 29 loads a control program and/or control data stored in a non-volatile rewritable memory (for example, flash memory; hereinafter, PROM 30) in advance into a high-speed semiconductor memory (hereinafter, RAM 31) and executes it by a computer (hereinafter, CPU 32) so as to actualize various functions necessary for the portable phone 10, such as a function for displaying icons, a function for generating events corresponding to user operations (touch operations) with respect to the icons, and a function for executing applications in response to the events by organic linkage between hardware resources such as the CPU 32 and software resources such as the control program.

The icons are operation target objects symbolizing and expressing the contents or targets of processing by parts such as small pictures, symbols, or figures in an operation screen of a computer application device. Since the user can directly touch and operate the icons, a user interface excellent in intuitiveness is obtained. Note that the operation target objects are not limited to icons. The icons are only required to be able to generate particular events when they are touched (selected). For example, the icons may be the information (information embedded in character strings, images, etc.) of links to various documents, Internet contents, and the like, or may be menu information and the like.

Generally, many of these icons are arranged on the home screen of the display section 12 of the portable phone 10. Particularly, the portable phone 10 of a multifunctional type called smartphone is configured to be able to download and freely install arbitrary applications from Internet sites. In this process, the icons of the respective applications are automatically arranged on the home screen. As a result, many icons corresponding to the number of the downloaded applications are arranged on the screen.

The presence of such many icons makes it difficult to find an application to be executed and deteriorates operability. Therefore, some sort of measure is required. As a measure therefor, in the present embodiment, contact patterns of a hand with respect to the housing 11 are detected, whereby operations for executing applications are simplified.

Figure 4:
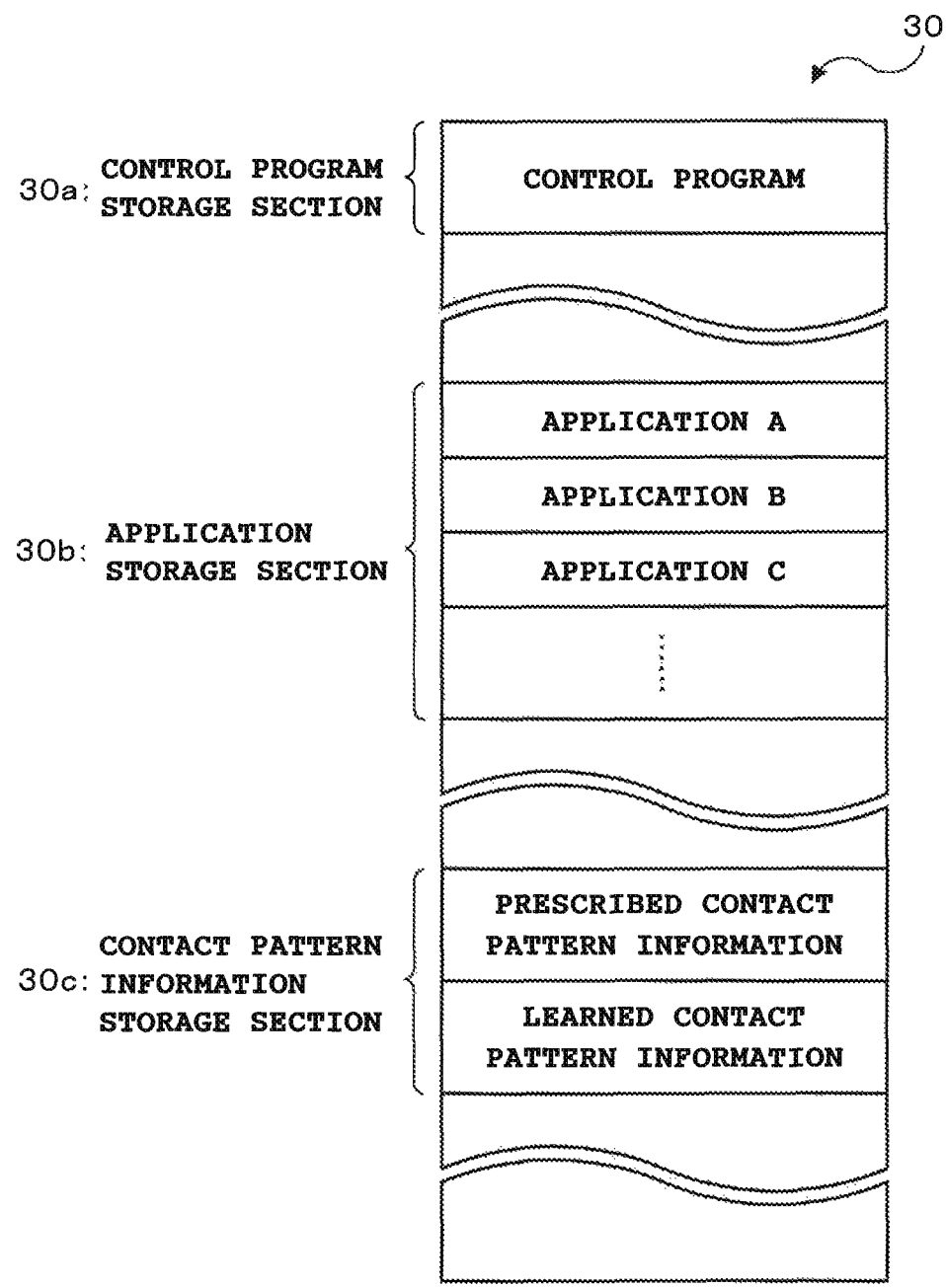
FIG. 4 is a diagram showing a conceptual storage configuration of a PROM 30.

FIG. 4 is a diagram showing a conceptual storage structure of the PROM 30. In the diagram, the PROM 30 has at least a control program storage section 30a, an application storage section 30b, and a contact pattern information storage section 30c. The PROM 30 stores a control program to be executed by the CPU 32 in the control program storage section 30a, stores a number of application programs (hereinafter, simply referred to as applications) (in this case, applications A, B, C, . . . ) in the application storage section 30b, and stores two types of contact pattern information in the contact pattern information storage section 30c.

One of the two types of contact pattern information is contact pattern information stored as prescribed values (default or initial values) in advance upon factory shipment, which is hereinafter referred to as "prescribed contact pattern information". The other one of the two types of contact pattern information is contact pattern information sequentially accumulated and stored by learning every time it is used by the user, which is hereinafter referred to as "learned contact pattern information".

FIGS. 5 (a) and 5 (b) are configuration schematic diagrams of prescribed contact pattern information and learned contact pattern information, respectively. In the diagrams, both of the prescribed contact pattern information and the learned contact pattern information have been configured such that a storage field for contact pattern information and a storage field for an operating state (in this case, executed application name) of the portable phone 10 are associate with one record. For example, application name "A" has been associated with prescribed contact pattern information "K001". Similarly, application name "A" has been associated with learned contact pattern information "G001".

These diagrams show character strings such as "K001", "K002", . . . and "G001", "G002", . . . etc. as contact pattern information. However, these character strings are examples for convenience of explanation. In practice, actual contact pattern information detected by the four contact sensors (the main surface contact sensor 21, the back surface contact sensor 22, the left lateral surface contact sensor 23, and the right lateral surface contact sensor 24) is stored.

As described above, the prescribed contact pattern information is contact pattern information stored as prescribed values in advance upon factory shipment, and the learned contact pattern information is contact pattern information sequentially accumulated and stored every time it is used by the user. Therefore, in the stage of the factory shipment, only the prescribed contact pattern information is present, and the learned contact pattern information is not present (is in a "vacant" state).

Figure 6:
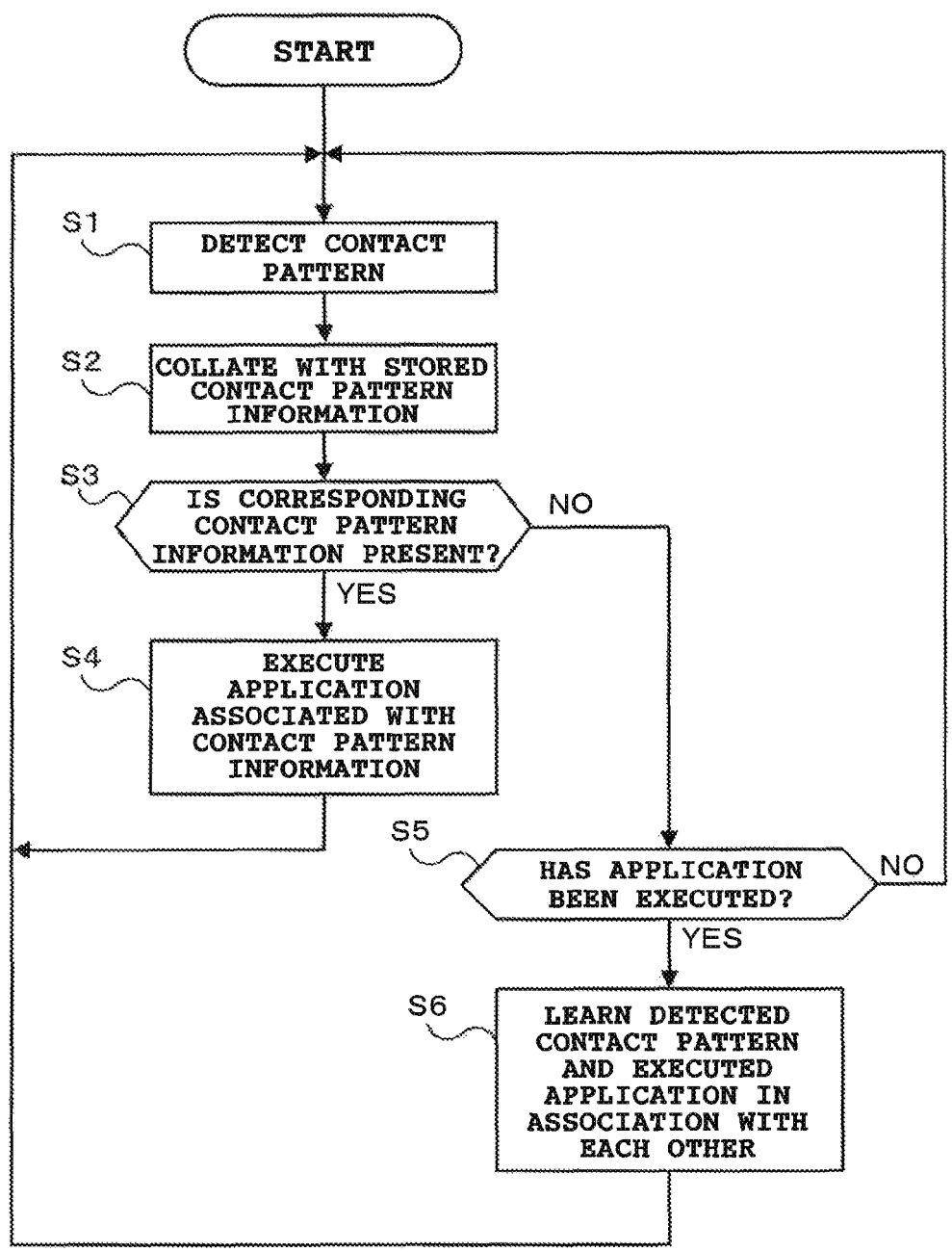
FIG. 6 is a diagram showing a brief flow of a control program.

FIG. 6 is a diagram showing a brief flow of the control program. In the diagram, first, the CPU 32 detects a pattern of contact with the housing 11 by using the four contact sensors (the main surface contact sensor 21, the back surface contact sensor 22, the left lateral surface contact sensor 23, and the right lateral surface contact sensor 24) (Step S1). Then, the CPU 32 collates the detected pattern with contact pattern information (prescribed contact pattern information and learned contact pattern information) in the contact pattern information storage section 30c of the PROM 30 (Step S2) and judges whether contact pattern information corresponding to the contact pattern detected at Step S1 is present in the contact pattern information storage section 30c of the PROM 30 or not (Step S3).

Then, when the corresponding contact pattern information is present, the CPU 32 executes an application associated with the contact pattern information (for example, application "A" when the contact pattern information is "K001" in FIG. 5 (a), or application "B" when the contact pattern information is "G002" in FIG. 5 (b) (Step S4) and returns to Step S1.

Conversely, when the corresponding contact pattern information is not present, the CPU 32 judges the presence/absence of an operation for executing an application by the user (Step S5). When judged that an application has not been executed, the CPU 32 returns to Step S1. When judged that an application has been executed, the CPU 32 learns the contact pattern detected at Step S1 and the name of the application judged to have been executed at Step S5, or in other words, stores the contact pattern and the name as "learned contact pattern information" in the contact pattern information storage section 30c of the PROM 30 (Step S6), and returns to Step S1.

As such, in the present embodiment, the names of applications to be executed are stored in advance in association with patterns of contact with the housing 11, an actual contact pattern with respect to the housing 11 is detected, and whether contact pattern information corresponding to the contact pattern has been stored is judged. When the corresponding contact pattern information has been stored, an application associated with the contact pattern information is executed. As a result of this configuration, a desired application can be immediately executed without its icon being touched every time.

Thus, a unique effect is acquired in that operability for executing an application of the portable phone 10 particularly having a number of icons can be improved.

Also, in the present embodiment, some typical prescribed contact pattern information is stored in advance in the stage of factory shipment. Therefore, an effect is acquired that, as long as the user contacts with the housing 11 with the same contact patterns as those of the prescribed contact pattern information, the user can immediately execute a desired application without touching an icon in the same manner.

However, this prescribed contact pattern information is merely typical contact patterns, and therefore it is possible that contact with the housing 11 with the same contact pattern cannot be made depending on the users. Accordingly, the present embodiment is configured to be able to learn patterns of actual contact by the user(s).

More specifically, when the corresponding contact pattern information is judged not to be present at Step S3 of FIG. 6 and an application is judged to have been executed at Step S5 of the same diagram, the CPU 32 learns the pattern of the actual contact with the housing 11 (in other words, the contact pattern detected in Step S1) and the name of the application judged to have been executed at Step S5, and stores them in the contact pattern information storage section 30c. Therefore, a preferred characteristic can be acquired in that, as the usage frequency of the user is increased, the accuracy of the collation of detected contact patterns with contact pattern information in the contact pattern information storage section 30c is gradually improved.

Here, the judgment at Step S3 of FIG. 6 cannot be made by simple binary judgment between conformity/non-conformity. This is because, in many cases, every contact pattern when the same application is executed by the same user is subtly different.

Figure 7:
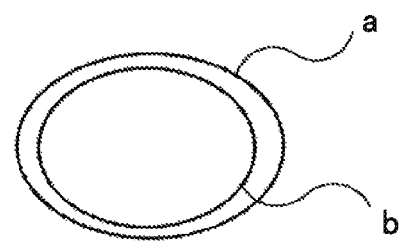
FIGS. 7 (a) and 7 (b) are conceptual diagrams of contact pattern judgment.
Figure 7:
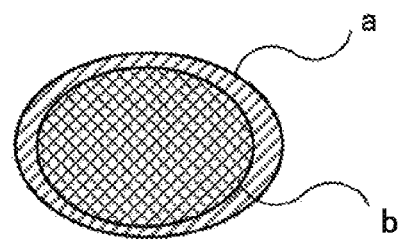
Figure 7:
Figure 7:

FIGS. 7 (a) and 7 (b) are conceptual diagrams of contact pattern judgment. For example, when the shape of the first contact pattern "a" having a horizontally wide elliptical shape for convenience of explanation, and the second contact pattern "b" having a similar horizontally wide elliptical shape, the shapes of these two patterns (a and b) are often subtly different, as shown in FIG. 7 (a). Therefore, the judgment cannot be made simply by conformity/non-conformity of the shapes.

Therefore, in the present embodiment, the judgment at Step S3 of FIG. 6 is made by collecting every contact pattern when the same application is executed by the same user, expressing the degree of the similarity of every contact pattern by a numerical value, and comparing the numerical value with a predetermined judgment threshold value. For example, the value of "set intersection" (referring to a set of entire elements belonging to all sets among the elements of the plurality of sets) can be used as the above-described "numerical value". More specifically, the judgment at Step S3 of FIG. 6 may be made by the value of the set intersection of every contact pattern being calculated and the value of the set intersection being compared with the predetermined judgment threshold value.

Incidentally, FIG. 7 (b) is a diagram showing the values of the set intersections of the two contact patterns (a and b) of FIG. 7 (a). The value of the set intersection of a portion where the two contact patterns (a and b) do not overlap with each other is "1", and the value of the set intersection of a portion where the two contact patterns overlap with each other is "2". The value of the set intersection of the overlapping portion is gradually increased as the number of times of contact pattern collection when the same application is performed by the same user is increased, and finally becomes a value that exceeds the predetermined judgment threshold value. Accordingly, thereafter, judgment at Step S3 of FIG. 6 can be made with no problem.

Figure 8:
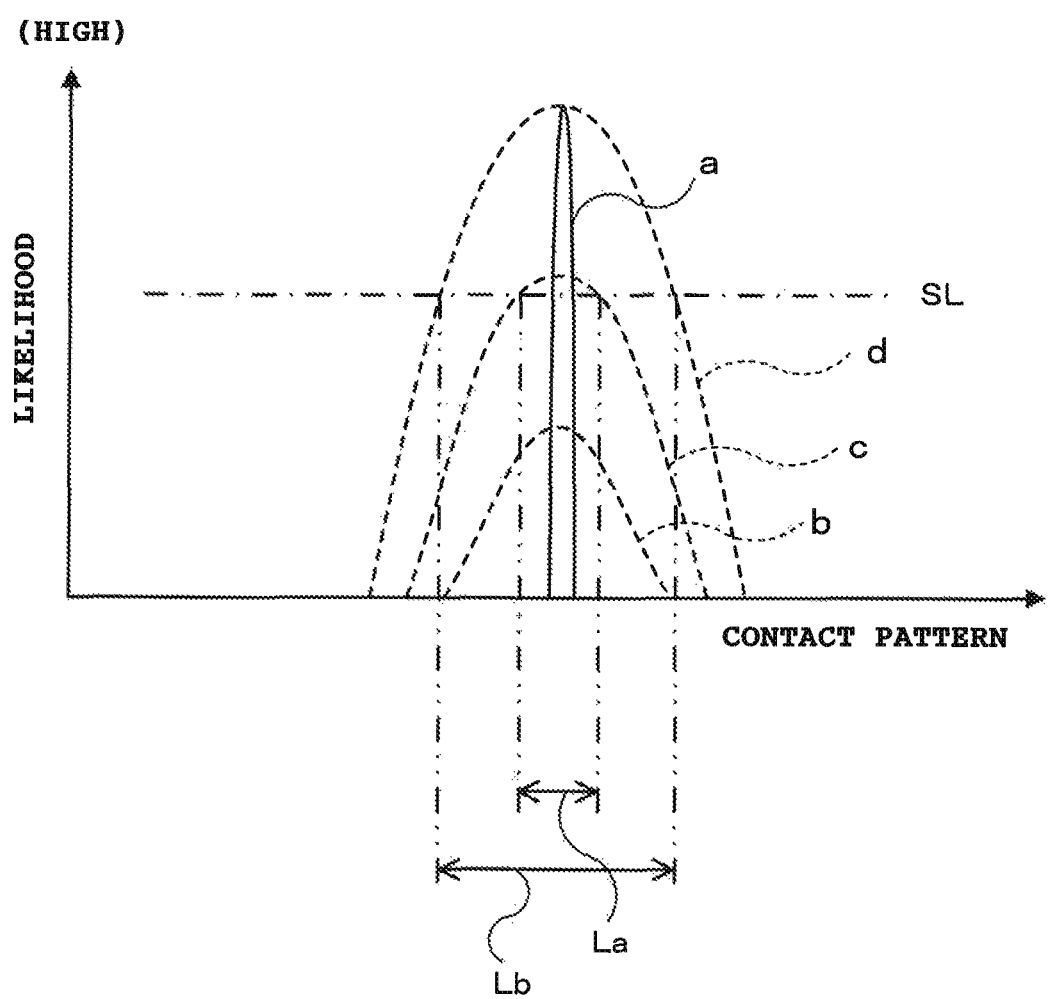
FIG. 8 is a judgment conceptual diagram of Step S3 of FIG. 6.

FIG. 8 is a judgment conceptual diagram of Step S3 of FIG. 6. In this diagram, a horizontal axis shows the size of the distribution of contact patterns, and a vertical axis shows the likelihood (probability) of the contact patterns. Pattern a shown by a solid line represents one piece of contact pattern information stored as prescribed values in advance upon factory shipment, and the distribution of this pattern a is narrow and has high likelihood. Judgment using pattern a has advantages that the judgment is highly accurate and erroneous judgment can be avoided while having a disadvantage that contact patterns having mismatched distributions cannot be correctly judged.

On the other hand, patterns b, c, and d shown by broken lines are actually-learned patterns. The values of the set intersections have been gradually increased from pattern b to pattern c and to pattern d as the degree of learning is advanced. In other words, the likelihood is increased from pattern b to pattern c and to pattern d.

When the same judgment threshold value (SL) is applied to these patterns a to d, highly accurate judgment can be made with the prescribed pattern a. Meanwhile, contact patterns having mismatched distributions cannot be correctly judged. On the other hand, with the learned patterns b to d, the patterns are below SL at first, and judgment by the contact patterns cannot be made. However, as the learning is advanced, the likelihood is gradually increased to pattern c and pattern d. As a result, judgment can be made at high accuracy equivalent to that of the pattern a. In addition, since the learned pattern c and pattern d have some degree of distribution widths (variations of the values of the set intersections), there is an advantage that, even if a contact pattern having slightly mismatched distribution is detected, judgment can be made in wide ranges La and Lb.

As a matter of course, the present embodiment is not limited to the above description, and includes various modification examples and advanced examples. For example, the learning results may be configured to be able to be reset (initialized). More specifically, the learned contact pattern information of the contact pattern information storage section 30c may be configured to be erasable at one time by a request from the user. This configuration is preferred because learning can be started from the initial state when, for example, the portable phone 10 is given to another user.

Also, in the present embodiment, the operating states of the portable phone 10 stored in the contact pattern information storage section 30c of the PROM 30 are "executed application names", or in other words, the application names of activation targets. However, the operating states are not limited thereto, and may be, for example, information of icons representing applications of activation targets, or the names of applications which are being executed (being activated). In addition, it may be operating states other than those of applications such as various touch events (scrolling events, pinch-in or pinch-out events, flick events, etc.) generated by the CPU 32 in response to touch operations on the touch panel (main surface sensor 21) of the display section 12.

Moreover, in the present embodiment, the contact sensors are used as the detection section for detecting the contact patterns of the housing 11. However the detection section is not limited thereto. For example, other sensors such as image sensors, temperature sensors, illuminance sensors, infrared-ray sensors, etc. may be used, or a combination of sensors including the contact sensors may be used.

Furthermore, in the present embodiment, contact pattern collation is performed every time at Step S2 of FIG. 6. However, depending on the situation, this collation may be omitted. For example, when the degree of reliability of contact pattern information stored in the contact pattern information storage section 30c of the PROM 30 is low, the above-described collation may be omitted, whereby unnecessary collation can be avoided and processing efficiency can be improved.

Still further, in the embodiment, contact pattern information is stored (learned) every time the user uses the portable phone 10. However, at the beginning, only contact pattern information having low accuracy is stored. Then, the accuracy of contact pattern information is gradually improved as the learning is advanced and, in the end, practically-usable and highly-reliable contact pattern information is stored. Whether the reliability is high enough for practical use may be judged based on, for example, the "likelihood" (see FIG. 8) of the contact pattern information. The CPU 32 may be configured not to carry out the above-described collation if the likelihood is below the judgment threshold value (SL) and to carry out the above-described collation if the likelihood is exceeding the judgment threshold value.

Instead of the above-described likelihood, the operation type of the portable phone 10, the operation position, the number of stored contact patterns associated with the states of the device, statistical values representing variations of a plurality of contact patterns, accuracy information obtained therefrom, etc. may be used. The statistical values representing variations are values representing the degrees of mismatching of respective contact patterns with respect to an average area of the plurality of stored contact patterns and are, for example, differences from a standard deviation or differences between a minimum value and a maximum value. When the number of the stored contact patterns is large, the characteristics of the contact patterns can be more precisely captured, whereby the accuracy becomes higher. Even if the number is not sufficiently large, when the variations are small, the accuracy becomes higher. The CPU 32 performs the collation at Step S2 of FIG. 6 when the accuracy is high and does not perform the collation when the accuracy is low.

The case where the accuracy is low refers to a case where appropriate accuracy set for every usage scene cannot be obtained because the number of the contact patterns is small or the number and the variations are large. In this case, the judgment may be made by using another section other than the detection section for detecting contact patterns. For example, as another section, a judgment section for judging passwords (personal identification numbers), a judgment section for fingerprint authentication or face authentication, etc. can be devised. The detection section for detecting contact patterns is extremely usable when the accuracy is sufficient, but adversely causes erroneous operations and is inconvenient when the accuracy is not sufficient. Therefore, although it is more cumbersome, the detection section may be switched to the above-described another section having high reliability. In this configuration where the another section is used in combination, if the detection section for detecting contact patterns is used, as a matter of course, the CPU 32 does not perform judgment by the above-described another section.

Also, a configuration may be adopted in which the method of the collation at Step S2 of FIG. 6 is changed depending on the state of the portable phone 10. For example, it is preferable that, when the portable phone 10 is in a state where locking is about to be released, the collation is performed with high accuracy. This is because the unlocking is to change the portable phone 10 from an unusable state to a usable state and requires more precise contact pattern judgment. Accordingly, for example, a configuration may be adopted in which a range sufficiently narrow with respect to variation ranges of a plurality of stored contact patterns is the collation range. Also, a configuration may be adopted in which the collation is performed with high accuracy when an operation to access individual information such as mails and photos is performed. This is because this case also requires more precise contact pattern judgment as in the case of unlocking. In some cases, the collation may be performed with low accuracy. Examples of this case include a case where an operation of taking photos or capturing moving images is performed. This is because it is desirable to have a characteristic to put importance on the speed so as not to miss imaging timing. For this purpose, a configuration may be adopted in which a range sufficiently large with respect to variation ranges of a plurality of stored contact patterns is the collation range.

This application is based upon and claims the benefit of priority from the prior Japanese Patent Application No. 2012-254218, filed Nov. 20, 2012, the entire contents of which are incorporated herein by reference.

(Supplementary Notes)

Hereinafter, Supplementary Notes describe the characteristics of the present invention.

The above-described embodiment can be partially or entirely described as in the following Supplementary Notes; however, the embodiment is not limited to these Supplementary Notes.

[1]

Figure 9:
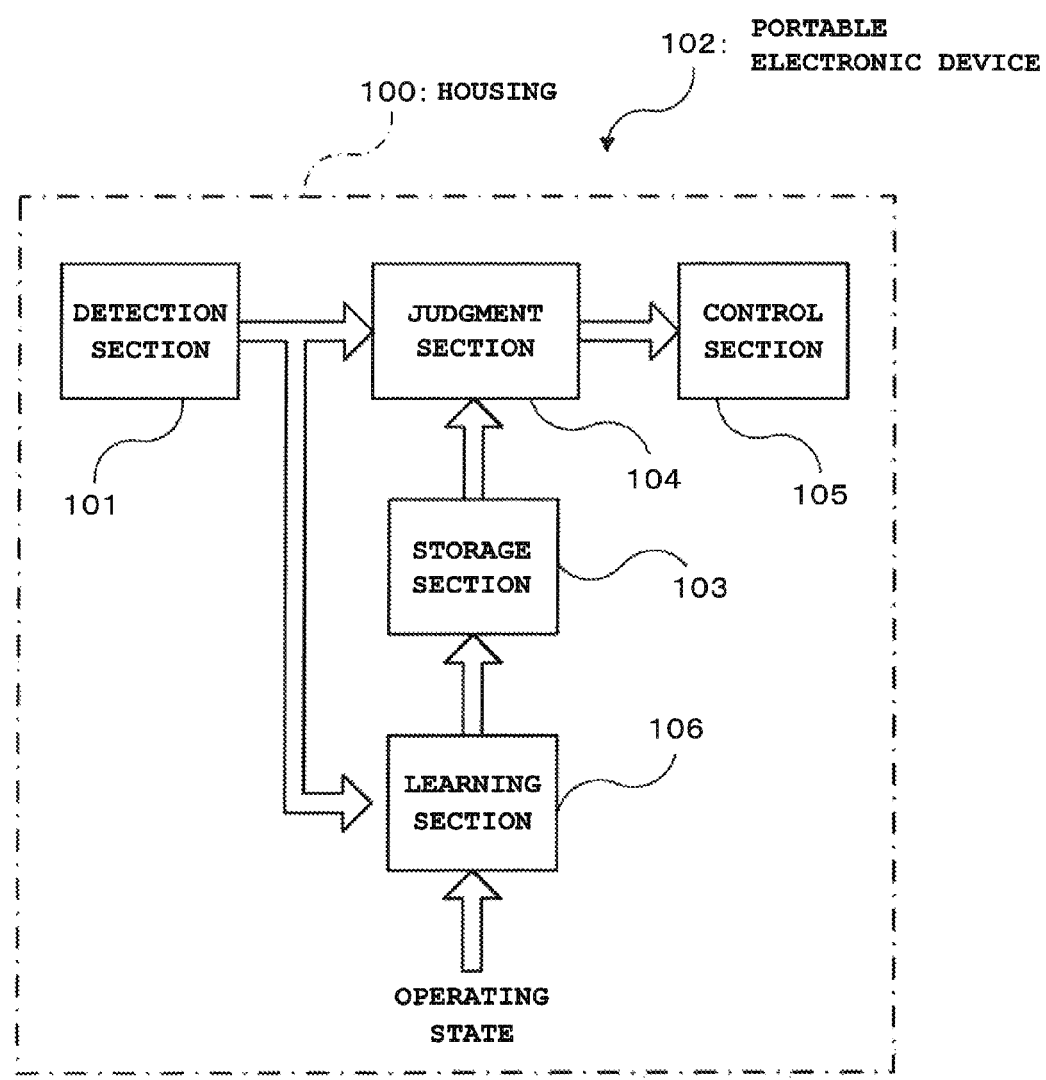
FIG. 9 is a configuration diagram of Supplementary Note 1.

FIG. 9 is a configuration diagram of Supplementary Note 1.

Supplementary Note 1 is a portable electronic device 102 comprising:

a detection section 101 (corresponding to the CPU 32 of the embodiment) for detecting a contact pattern of a contact object to a housing 100 (corresponding to the housing 11 of the embodiment);

a storage section 103 (corresponding to the PROM 30 of the embodiment) capable of storing an operating state of the portable electronic device 102 (corresponding to the portable phone 10 of the embodiment) and the contact pattern in association with each other;

a judgment section 104 (corresponding to the CPU 32 of the embodiment) for judging whether or not a contact pattern corresponding to the contact pattern detected by the detection section 101 has been stored in the storage section 103;

a control section 105 (corresponding to the CPU 32 of the embodiment) for controlling the portable electronic device 102 to enter the operating state associated with the contact pattern and stored in the storage section 103 when the judgment section 104 judges that the corresponding contact pattern has been stored in the storage section 103; and a learning section 106 (corresponding to the CPU 32 of the embodiment) for storing, in the storage section 103, the contact pattern detected by the detection section 101 and an operating state of the portable electronic device 102 executed by a user when or immediately after the contact pattern is detected in association with each other.

[2]

Supplementary Note 2 is the portable electronic device according to Supplementary Note 1, wherein the storage section stores the operating state of the portable electronic device and the contact pattern in association with each other in advance.

[3]

Supplementary Note 3 is the portable electronic device according to Supplementary Note 1, wherein the judgment section makes the judgment when the contact pattern stored in the storage section exceeds predetermined accuracy.

[4]

Supplementary Note 4 is the portable electronic device according to Supplementary Note 1, wherein the operating state is related to an application activated in the portable electronic device.

[5]

Supplementary Note 5 is the portable electronic device according to Supplementary Note 1, wherein the operating state is related to an application serving as an activation target in the portable electronic device.

[6]

Supplementary Note 6 is the portable electronic device according to Supplementary Note 1, wherein the operating state is related to a scrolling event.

[7]

Supplementary Note 7 is the portable electronic device according to Supplementary Note 1, wherein the operating state is related to a pinch-in or pinch-out event.

[8]

Supplemental Note 8 is the portable electronic device according to Supplemental Note 1, wherein the operating state is related to a flick event.

[9]

Supplemental Note 9 is a method for controlling a portable electronic device comprising:

a detection step of detecting a contact pattern of a contact object to a housing;

a storage step capable of storing an operating state of the portable electronic device and the contact pattern in a storage section in association with each other;

a judgment step of judging whether or not a contact pattern corresponding to the contact pattern detected in the detection step has been stored in the storage section;

a control step of controlling the portable electronic device to enter the operating state associated with the contact pattern and stored in the storage section when the corresponding contact pattern is judged to have been stored in the storage section in the judgment step; and a learning step of storing, in the storage section, the contact pattern detected in the detection step and the operating state of the portable electronic device executed by a user when or immediately after the contact pattern is detected in association with each other.

[10]

Supplementary Note 10 is a non-transitory computer-readable storage medium having a program stored thereon that is executable by a computer of a portable electronic device to actualize functions comprising:

a detection section for detecting a contact pattern of a contact object to a housing;

a storage section capable of storing an operating state of the portable electronic device and the contact pattern in association with each other;

a judgment section for judging whether or not a contact pattern corresponding to the contact pattern detected by the detection section has been stored in the storage section;

a control section for controlling the portable electronic device to enter the operating state associated with the contact pattern and stored in the storage section when the judgment section judges that the corresponding contact pattern has been stored in the storage section; and a learning section for storing, in the storage means, the contact pattern detected by the detection section and an operating state of the portable electronic device executed by a user when or immediately after the contact pattern is detected in association with each other.

DESCRIPTION OF REFERENCE NUMERALS

10 portable telephone
11 housing
30 PROM
32 CPU
100 housing
101 detection section
102 portable electronic device
103 storage section
104 judgment section
105 control section
106 learning section

What is claimed is:

1. A portable electronic device comprising:
a storage configured to store in advance a plurality of instruction operations to be performed on a touch panel on a display provided on a surface of the portable electronic device in association with a plurality of different contact patterns, respectively; and
at least one processor configured to implement:
a detector configured to detect, by a contact sensor of the touch panel and another contact sensor provided on another surface different from the surface provided with the touch panel, a contact pattern of a contact object to a housing;
a determiner configured to make a determination regarding whether or not a contact pattern corresponding to the contact pattern detected by the detector has been stored in the storage;

a controller configured to control the portable electronic device to execute an instruction operation stored in the storage in association with the corresponding contact pattern when the determiner determines that the corresponding contact pattern has been stored in the storage,
wherein the controller is further configured, in response to the determiner determining that the contact pattern corresponding to the contact pattern detected by the detector has not been stored in the storage, to store, in the storage, the contact pattern detected by the detector in association with an instruction operation performed by a user, the performed instruction operation caused by contact detected by the contact sensor of the touch panel when or immediately after the contact pattern is detected; and, in response to the determiner determining that the contact pattern corresponding to the contact pattern detected by the detector has been stored in the storage, to update the corresponding contact pattern based on the contact pattern detected by the detector, and store the updated corresponding contact pattern in the storage.

2. The portable electronic device according to claim 1, wherein the storage stores an instruction operation in association with a prescribed contact pattern in advance.

3. The portable electronic device according to claim 1, wherein the determiner makes the determination when the corresponding contact pattern stored in the storage exceeds predetermined accuracy.

4. The portable electronic device according to claim 1, wherein the instruction operation is related to an application activated in the portable electronic device.

5. The portable electronic device according to claim 1, wherein the instruction operation is related to an application serving as an activation target in the portable electronic device.

6. The portable electronic device according to claim 1, wherein the instruction is related to a scrolling event.

7. The portable electronic device according to claim 1, wherein the instruction operation is related to a pinch-in or pinch-out event.

8. The portable electronic device according to claim 1, wherein the instruction operation is related to a flick event.

9. A method for controlling a portable electronic device comprising:
a storage step storing in advance, in a storage, a plurality of instruction operations to be performed on a touch panel on a display provided on a surface of the portable electronic device in association with a plurality of different contact patterns, respectively;
a detection step of detecting, by a contact sensor of the touch panel and another contact sensor provided on another surface different from the surface provided with the touch panel, a contact pattern of a contact object to a housing;
a judgment step of judging whether or not a contact pattern corresponding to the contact pattern detected in the detection step has been stored in the storage;
a control step of controlling the portable electronic device to execute an instruction operation stored in the storage in association with the corresponding contact pattern when the corresponding contact pattern is judged to have been stored in the storage in the judgment step; and
a learning step of, in response to the judgment step judging that a contact pattern corresponding to the contact pattern detected by the detection step has not been stored in the storage, storing, in the storage, the contact pattern detected in the detection step in association with an instruction operation performed by a user, the performed instruction operation caused by contact detected by the contact sensor of the touch panel when or immediately after the contact pattern is detected; and, in response to the judgment step judging that a contact pattern corresponding to the contact pattern detected by the detection step has been stored in the storage, updating the corresponding contact pattern based on the contact pattern detected by the detection step, and stores the updated corresponding contact pattern in the storage.

10. A non-transitory computer-readable storage medium having a program stored thereon that is executable by a computer of a portable electronic device to actualize functions comprising:
storing in advance, in a storage, a plurality of instruction operations to be performed on a touch panel on a display provided on a surface of the portable electronic device in association with a plurality of different contact patterns, respectively;
detecting, by a contact sensor of the touch panel and another contact sensor provided on another surface different from the surface provided with the touch panel, a contact pattern of a contact object to a housing;
judging whether or not a contact pattern corresponding to the detected contact pattern has controlling the portable electronic device to execute an Instruction operation stored in association with the corresponding contact pattern, when the judging judges that the corresponding contact pattern has been stored in the storage; and
in response to determining that a contact pattern corresponding to the detected contact pattern has not been stored, storing the detected contact pattern in association with an Instruction operation performed by a user, the performed instruction operation caused by contact detected by the contact sensor of the touch panel when or immediately after the contact pattern is detected; and
in response to determining that a contact pattern corresponding to the detected contact pattern has been stored, updating the corresponding contact pattern based on the detected contact pattern, and storing the updated corresponding contact pattern.

* * * * *